March 7, 1961 L. W. BELL 2,973,520
SMALL DIAMETER STUD ADAPTER
Filed June 16, 1959 2 Sheets-Sheet 1

INVENTOR.
LEWIS WALTER BELL
BY Edward Halle
ATTORNEY

March 7, 1961 L. W. BELL 2,973,520
SMALL DIAMETER STUD ADAPTER
Filed June 16, 1959 2 Sheets-Sheet 2
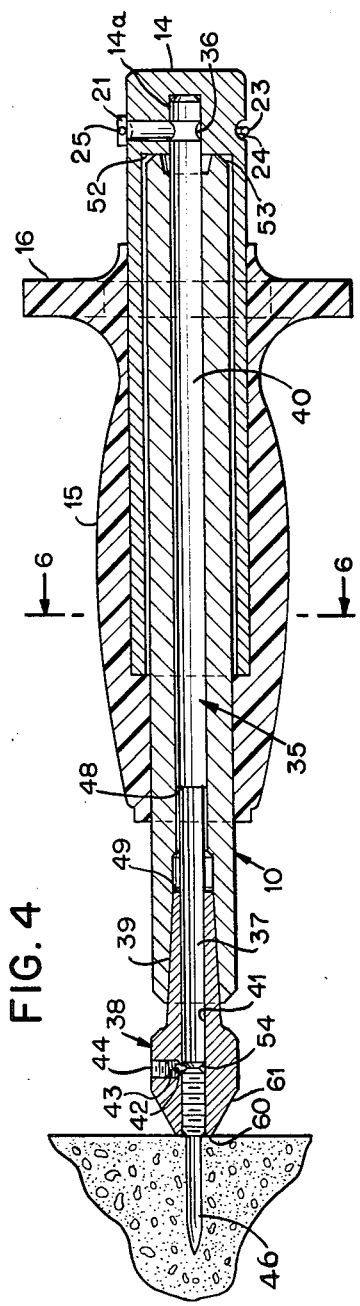
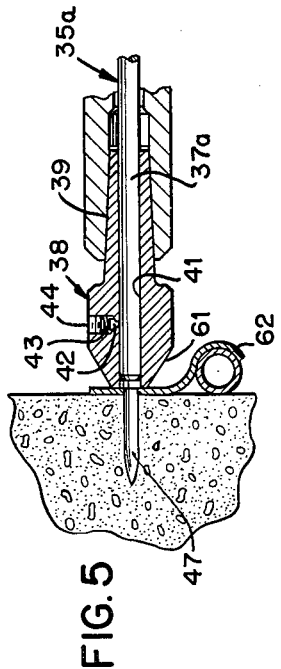
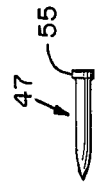
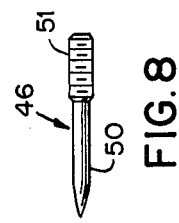
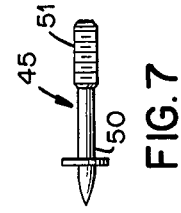
INVENTOR.
LEWIS WALTER BELL
BY
Edward Halle
ATTORNEY United States Patent Office 2,973,520
Patented Mar. 7, 1961

2,973,520

SMALL DIAMETER STUD ADAPTER

Lewis Walter Bell, Monroe, N.Y., assignor to Star Precision Devices, Inc., Mountainville, N.Y., a corporation of Delaware Filed June 16, 1959, Ser. No. 820,793

2 Claims. (Cl. 1—47)

This invention relates to an adapter for a combination tool such as the one described in the co-pending application of Richard H. Maynard and Walter Bell for Combination Hand Tool filed September 2, 1958, Serial No. 758,363. The adapter described herein is designed to be used in combination with the mentioned hand tool in order to adapt it to drive studs and nails, or the like, having a smaller diameter than the bore of the guide member of the combination hand tool. It is therefore an object of this invention to provide a small diameter stud or nail adapter for a combination hand stud driving tool and tool holder, which will adapt the said hand tool to drive studs of narrower cross section diameter than the studs normally driven by the said tool.

It is another object of this invention to provide such an adapter for use with a combination hand tool, which will have a piston adapter to fit within the bore of the guide member of the said combination hand tool and have a reduced end portion which will fit into the bore of the adapter device.

It is a further object of this invention to provide such an adapter and piston wherein the distance that a stud is driven into a working surface can be predetermined by presize of the reduced end portion of the piston. Further objects and advantages will appear from the specification hereinbelow in which Fig. 1 is a cross section of the striking head of our combination hand tool and grip handle cover showing the normal driving piston 20 in extended position, with the guide member not shown.

Fig. 2 is a cross section of the guide member of the combination tool with the striker head and other appurtenances removed, and the small bore adapter 38, in position for insertion into the tapered tool holder 13 of the guide member, with a small diameter stud 46 in the bore thereof, in position for driving.

Fig. 3 is a view similar to Fig. 1 with the normal driving piston 20 removed, and a small diameter driving piston 35 (with reduced end portion 37) in place.

Fig. 4 is a side elevation of the tool with all of the small diameter components in place as they would appear when the small diameter stud is completely driven by the tool (with portions of the view in section to show the relationship of the component parts), Fig. 5 is a detail of an alternate form of the tool adapted for driving small diameter nails into a working surface, showing a small diameter nail after it is completely driven in by the tool, to fasten a cable clamp to the working surface, Fig. 6 is a cross section along the lines 6—6 in Fig. 4.

Fig. 7 is a small diameter stud with a washer on the shank,

Fig. 8 is a small diameter stud without a washer, and

Fig. 9 is a form of small diameter nail.

Similar numerals refer to similar parts throughout the several views.

Figure 1:
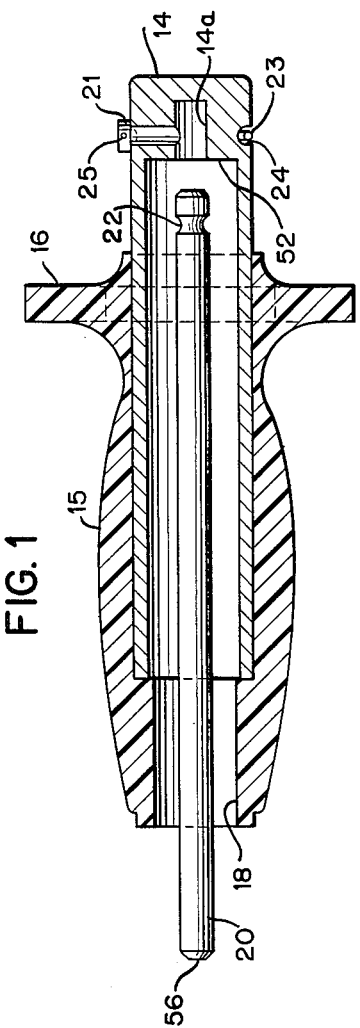
Figure 2:
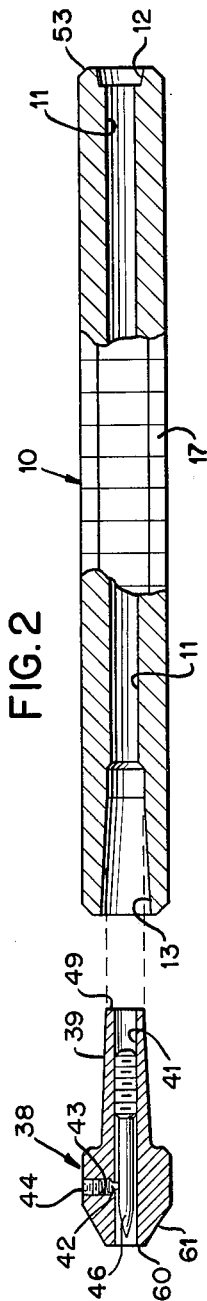
Figure 3:
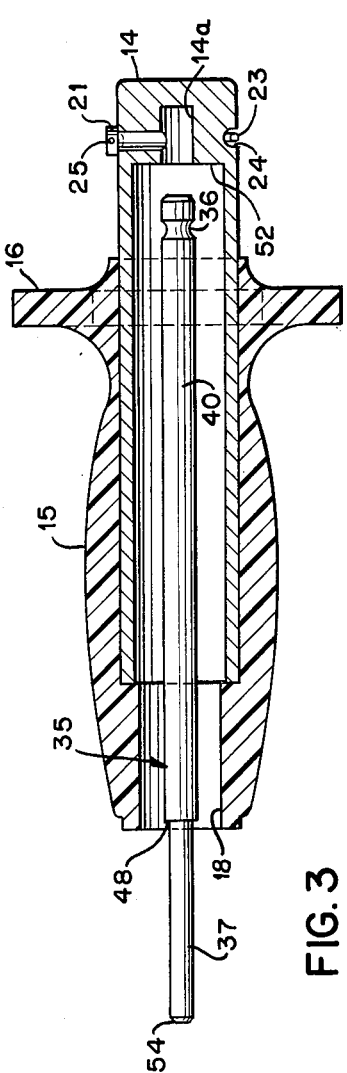

The main body portion of the tool is the guide member 10, of the basic tool described in the above mentioned co-pending application. The guide member 10 is made out of steel, or other metal or material sufficiently strong for the purpose of the tool. The guide member 10 has a centrally located bore 11. At one end of the bore 11, a tapered counterbore 12 is provided for retaining a stud with washer retaining means in the bore 11 as described in the abovementioned co-pending application. At the other end of the bore 11 a tapered tool holder 13 is provided to hold a tool such as a drill, with an end taper, by means of friction.

The small bore adapter 38 is designed to fit into the tool holder 13. A small bore driving member 35 with a reduced end portion adapted to replace the normal driving piston 20 is provided to cooperate with the small bore adapter 38.

The basic tool of the co-pending application has a striker head 14 adapted to fit around the guide member 10. The striker head 14 is covered with a grip-handle cover 15 having a hand guard portion 16. Elements 15 and 16 are made of rubber, plastic, metal or any other suitable material. It is desirable to provide a resilient material for the grip 15 and guard 16 so that they may act as a shock absorber to protect the hand of the operator. A substantial portion of the grip 15, and adjacent to the guard portion 16, is bonded or otherwise attached to a portion of the outside of the striker head 14 by means of a suitable adhesive designed to bond rubber to metal, or other attaching means. The other portion of the grip 15 which extends beyond the striker head 14 is adapted to slide freely over the outside of the guide member 10.

In order to provide control of the rotation of the tool when in use, the guide member is constructed with outer hexagon sections 17 which correspond with inner hexagon sections 18 for that portion of the grip 15 which extends beyond the striker head 14.

While I show a hexagon formation 17, 18 in the prefered form of the invention, the control means may be by any other keying shape or formation.

There is a normal stud driving member or piston 20 which fits slideably within the bore 11 for driving studs which normally fit within the bore 11. The normal piston 20 is releasably secured inside the striker head 14 by means of a pin or detent 21 in the head of the striker 14 adapted to fit into an annular groove 22 at one end of the piston 20. The detent 21 is kept in position by means of a spring wire 23 adapted to fit around an annular groove 24 on the circumference of the striker head 14. The spring wire 23 passes through an opening 25 in the head of the detent 21. The piston 20 may be releasably secured within the striker head 14 by any other suitable means such as spring clip, ball detent, and so forth.

The normal driving member 20 is installed within the striker head 14 by pushing the groove 22 end of the normal driving member 20 into the hole 14a. This action lifts the detent 25 against the force of the spring 23. When the member 20 is fully home, the detent 21 is forced into the annular groove 22 of the piston 20 by the spring wire 23. The piston 20 may be removed from the striker head 14 by reversing the operation.

The use of the basic tool as a stud driver and/or a star drill holder, or other type of tool holder, is described in the aforesaid co-pending application.

When it is desired to use the basic tool as a hand stud driver for nails or studs, or the like, which are smaller in diameter than the bore 11, the normal driving member 20 is removed and replaced with a small diameter driving member 35 having an annular groove 36 and a reduced diameter end portion 37. The grooved end 36, of the small bore driving member 35 is fitted into and removed from the hole 14a in the same manner as the grooved end 22 of the normal driving member 20. A small diameter bore adapter 38 having a tapered end 39 is inserted into the tapered tool holder 13 of the guide member 10. A larger diameter portion 40 of the small diameter drive member 35 is adapted to fit slideably within the bore 11, and the reduced diameter end portion 37 is adapted to fit slideably within the bore 41 of the small diameter adapter 38.

A ball detent 42, maintained in place by a spring 43, and set screw 44, is provided to hold the small diameter stud 45, or 46, or nail 47 in the bore 41, of the adapter 38, until the stud or nail is driven into the working surface. The detent 42 enters the bore 41 and is forced against the stud 45, 46, or nail 47. As the stud or nail is driven past the detent 42 it is forced back against the spring 43, permitting the stud or nail to move forward.

The various component parts of the adapter device may be made of steel, or other suitable material which is strong enough to withstand the forces attendant to the use of the tool.

The reduced portion 37 of the small diameter driving member 35 must be sufficiently long to provide clearance between the shoulder 48 (formed by the reduced portion 37 and the wider portion 40) and the inner end 49 of the adapter 38, when the parts are in place and the striker head 14 is driven home (as shown in Fig. 4 of the drawings). If this clearance is not provided the action of the forward movement of the driving member 35 will knock the adapter 38 out of the tool during the driving operation.

Each of the studs 45 and 46 has a pointed shank 50 and a threaded head 51. It is desirable to leave a portion of the head 51 protruding from the work surface so that a nut can be threaded on. This purpose is accomplished by the following means: When the striker head 14 is driven home its inner end surface 52 contacts the end 53 of the guide member 10. This limits further movement of the striker head 14. The length of that part of the driving member 35 between the inner end surface 52, of the striker head 14, and the outer end 54 (of the driving member 35) should be less than total length of the assembly of the guide member 10 and adapter 38, by a dimension equivalent to the portion of the head 51 which should protrude from the working surface. For example: if it is desired to have 3/8" of the head 51 to protrude, and the assembly of the guide member 10 and adapter 38 is 7½" long, then the driving member 35 should be 7⅛" long from the inner end surface 52 of the striker head 14 to the outer end of the driving member 35. These dimensions are given by way of example and may be varied to suit the particular size and style of stud 45 and 46, or nail 47, and of the guide member 10 and adapter 38, used.

In the alternate form for driving nails 47 having a head 55 as shown in Fig. 5 of the drawings the driving member 35a will have a longer reduced end portion 37a and greater total length than the above described driving member 35. In such case the greater length would have to be provided to compensate for the fact that the head 55 of the nail 47, is shorter than the threaded head 51 of the studs 45 and 46.

The forward end 60 of the adapter 35 has a bevelled edge 61. This is provided to permit the tool to be used in corners and other tight places. The beveled edge 61 also makes the tool adaptable for use in securing cable clamps 62 which may have only a limited amount of flat surface to bear against.

After the tool is used it will be found that the adapter 38 becomes frictionally force fitted into the tool holder 13, and is indeed difficult to remove. In order to effect easy removal, the striker head 14 is slid off the tool and the small diameter driving member 35 is replaced with the normal driving member 20. The striker head 14 with the normal drive member 20 in place is then refitted to the tool. The outer end 56 of the drive member 20 will fit against the inner end 49 of the adapter 38. A smart tap on the striker head 14 will then eject the adapter 38.

While I have described the improvement in its preferred forms there are other forms which it may take without leaving the scope of the invention as described in the claims below. I therefore desire to be protected for all forms within the claims.

Wherefore, I claim:

1. A small bore adapter, for a fastener driving tool comprising a guide member with a through bore having a tool receiving portion at one end thereof, comprising a body having a through bore, and a tapered portion adapted to frictionally fit into said tool receiving portion of the through bore of the guide member, said adapter bore having means to releasably engage and retain a fastener.

2. A driving tool comprising a guide member with a through bore having an adapter holding portion and a striker head with driving member receiving means, and an adapter having a through bore of smaller diameter than the first mentioned bore and an end adapted to fit into the tool holding portion of the through bore of the said guide member, and a driving member removably received in the driving member receiving means of the striker head and adapted to fit slideably within the through bore of the guide member, said removable driving member having a reduced end portion adapted to fit slideably within the bore of the adapter.

References Cited in the file of this patent

UNITED STATES PATENTS

| 181,126 | Angst | Aug. 15, 1876 |
| 562,518 | Ferguson | June 23, 1896 |
| 1,052,846 | Price | Feb. 11, 1913 |
| 1,141,073 | Parks | May 25, 1915 |
| 1,164,086 | Gooding | Dec. 14, 1915 |
| 2,855,601 | Hamlin | Oct. 14, 1958 |

FOREIGN PATENTS

| 177,649 | Great Britain | Apr. 6, 1922 |